United States Patent [19]

Jacobs

[11] 4,140,323
[45] Feb. 20, 1979

[54] EMBOSSED GASKET

[75] Inventor: Donald D. Jacobs, Highland Park, Ill.

[73] Assignee: Felt Products Mfg. Co., Skokie, Ill.

[21] Appl. No.: 832,414

[22] Filed: Sep. 12, 1977

[51] Int. Cl.² ............... B65D 53/00; F02F 11/00; F16J 15/12
[52] U.S. Cl. .................. 277/166; 277/180; 277/207 R; 277/235 B; 285/DIG. 11; 215/341
[58] Field of Search ............... 277/166, 180, 186, 189, 277/207 R, 214, 235 R, 235 A, 235 B, DIG. 6; 285/DIG. 11; 215/341

[56] References Cited

U.S. PATENT DOCUMENTS

| | | | |
|---|---|---|---|
| 2,058,010 | 10/1936 | Fitch | 277/235 B UX |
| 2,720,406 | 10/1955 | Balfe | 277/166 |
| 2,949,325 | 8/1960 | Nenzell | 285/DIG. 11 |
| 3,053,544 | 9/1962 | Gossica | 277/180 |
| 3,721,452 | 3/1973 | Black | 277/235 R X |
| 3,794,333 | 2/1974 | Czernik et al. | 277/235 B X |
| 3,871,034 | 3/1975 | Weigel | 277/207 X |
| 3,930,656 | 1/1976 | Jelinek | 277/180 |

FOREIGN PATENT DOCUMENTS

| | | | |
|---|---|---|---|
| 473101 | 4/1951 | Canada | 277/207 |
| 568359 | 12/1958 | Canada | 215/341 |
| 699116 | 12/1964 | Canada | 277/235 B |
| 819177 | 10/1951 | Fed. Rep. of Germany | 277/235 B |
| 1297195 | 5/1962 | France | 277/235 R |
| 270448 | 1/1930 | Italy | 277/207 |
| 652204 | 4/1951 | United Kingdom | 215/341 |
| 899552 | 6/1962 | United Kingdom | 277/235 B |
| 954327 | 4/1964 | United Kingdom | 277/166 |
| 1033507 | 6/1966 | United Kingdom | 277/235 B |

Primary Examiner—Robert S. Ward, Jr.
Attorney, Agent, or Firm—Dressler, Goldsmith, Clement, Gordon & Shore, Ltd.

[57] ABSTRACT

An embossed gasket for providing a seal between a pair of confronting surfaces has at least one aperture and at least one embossment adjacent the aperture. The embossment defines a cavity, and a filler is disposed in the cavity. The filler prevents the embossment from flattening out when the gasket is compressed between two confronting surfaces, thereby concentrating the sealing effect of the embossment in the zone of the embossment and enhancing the sealing characteristics of the gasket.

3 Claims, 5 Drawing Figures

EMBOSSED GASKET

BACKGROUND OF THE INVENTION

This invention relates to gaskets having embossments of improved strength which resist flattening under compression thereby enhancing their sealing characteristics.

Gaskets are widely used for providing seals between pairs of confronting surfaces, such as between engine blocks and heads in internal combustion engines, and the like. Gaskets used in such applications must provide an effective seal between the relatively large number of interconnecting cavities carrying fluids of different types and under different pressures so that the fluids do not intermingle or leak externally. Such gaskets most frequently incorporate a metallic body and may be provided with one or more sealing embossments. Such embossments are projections provided on the body of the gasket for the purpose of providing a smaller area of contact between the gasket and the confronting surfaces in order to increase the compression force per unit area, thereby to generate a more effective seal. U.S. Pat. No. 3,352,564 to Johnson discloses a gasket having typical embossments which are formed by deforming the metal body, as around cylinder openings, so the body is deflected upwardly and downwardly from the plane of the surrounding gasket metal. An embossment made in this manner includes a raised portion or projection, and defines a corresponding indented portion or recess on the other side of the projection.

One of the problems which has been encountered with gaskets having embossments of the kind typified by those shown in the Johnson patent is that the embossments flatten under compression. When this occurs, the load which was intended to be concentrated in the zone of the embossment tends to be distributed over a much broader surface of the gasket, consequently lowering the effectiveness of the seal.

SUMMARY OF THE INVENTION

In accordance with the present invention, an embossed gasket is provided for forming a seal between a pair of confronting surfaces. The gasket includes a body having a pair of spaced apart major surfaces defining at least one aperture therethrough. At least one embossment is provided in the body of the gasket. The embossment includes at least one projection extending outwardly from one major surface, and a corresponding indentation or recess extending upwardly from the other major surface. The gasket, and particularly the embossed portion of the gasket, is adapted to be positioned between a pair of confronting surfaces and to be compressed into sealing engagement with the pair of surfaces. A filler, such as a sealant, is disposed in the indentation or recess of the embossment, so that when the embossment is compressed between the two confronting surfaces, the sealant prevents the embossment from flattening out and losing much of its intended sealing capacity, thereby enhancing the sealing characteristics.

By preventing the embossments from flattening out, the compression forces between the two confronting surfaces tend to remain concentrated at the zone of the embossment, i.e., at the upper surface of the projection and at the surface areas adjacent the edges of the recess. Thus, by providing a filler in the indentations of the embossment, the embossments are prevented from flattening out, and the gasket provides a much more effective seal between the surfaces to be sealed such as between a cylinder block and head.

THE DRAWINGS

DETAILED DESCRIPTION

Figure 1:
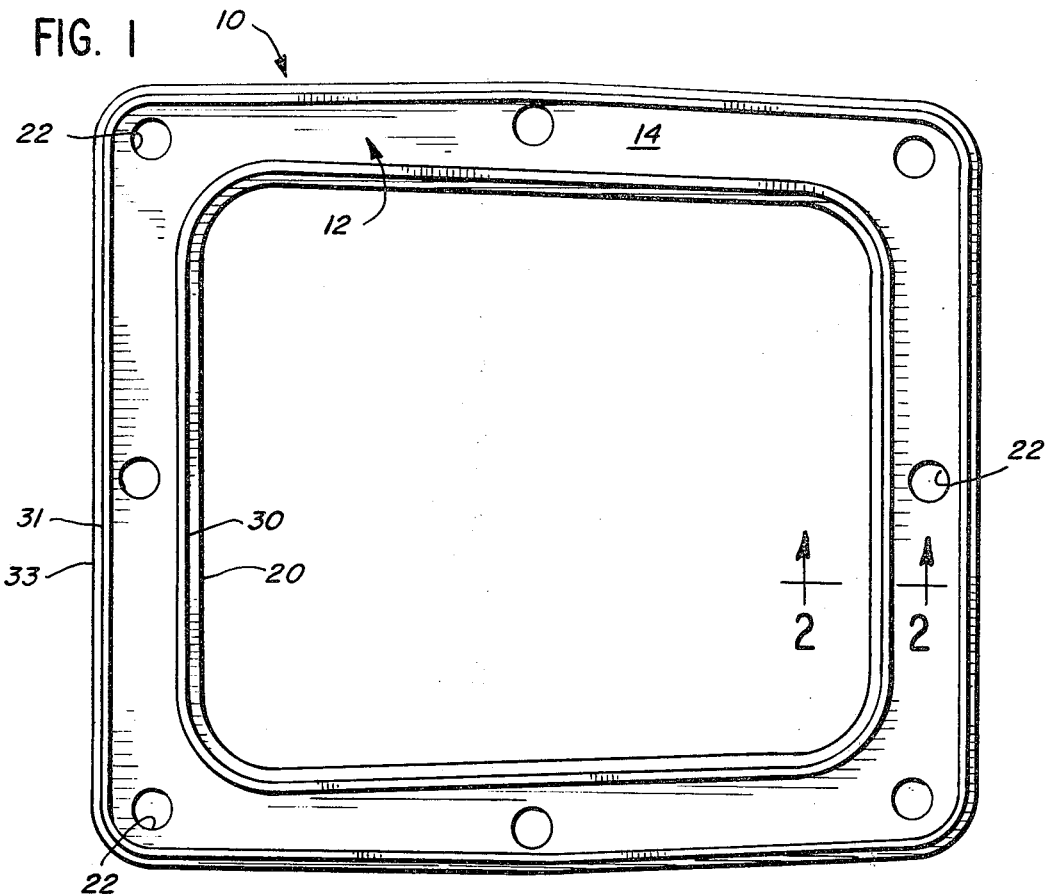
FIG. 1 is a plan view of a gasket incorporating embossments provided with a filler in accordance with the present invention.
Figure 2:
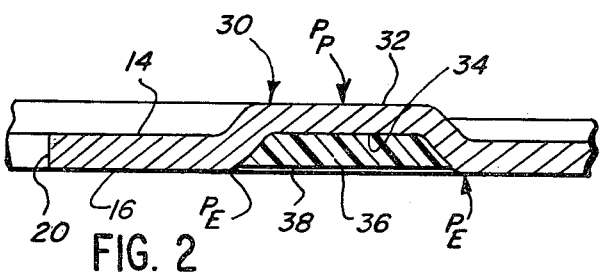
FIG. 2 is an enlarged fragmentary cross-sectional view taken along line 2—2 of FIG. 1 showing an embossment in an uncompressed state.

Referring first to FIGS. 1 and 2, a typical gasket assembly 10 embodying the principles of this invention comprises a main gasket base or body 12 having a first upper gasket face 14 and a second lower gasket face 16. The main gasket body 12 may be a steel plate having a thickness of approximately 0.020 inches. However, the gasket body, depending upon the use to which the gasket assembly is to be put, may be of other materials and constructions, of which those described in U.S. Pat. Nos. 3,565,449 and 3,108,818 are typical. The gasket body 12 defines a plurality of suitably positioned apertures which may include a main aperture and openings for bolt holes, and the like. In the gasket assemby 10, which is intended for use as an intake manifold gasket, the gasket body 12 includes main aperture 20 and smaller apertures 22 for bolt holes.

Gasket body 12 defines a continuous embossment 30 which is spaced from main aperture 20 in the preferred embodiment of the invention shown in FIG. 1. Gasket body 12 also defines a continuous embossment 31 which is spaced from outer edge 33 of the gasket. The embossments are formed in known manner as by pressing them into the planar sheet metal plate or other material of which body 12 may be formed. The sealing embossments may be of varying depths and dimensions depending upon the use to which the gasket is to be put.

As is best shown in FIG. 2, embossment 30 comprises a projecting portion or projection 32 extending outwardly from major surface 14, and a corresponding indentation, recess or cavity 34 which extends upwardly from major surface 16. Embossment 31 is of similar construction.

In accordance with this invention, a filler material, filler 36, which may preferably be a sealant such as a resilient elastomeric material, is disposed in indentation 34. One elastomeric material which is particularly suitable for use as a filler is a silicone elastomer, such as one sold by Dow Corning under the name Sylgard 187. Sylgard 187 is available as a two component pourable system and may be generally described as being a condensation product of a linear, fluid organo polysiloxane containing terminal hydroxyl groups with an alkyl silicate ester. Usually a catalyst comprising a metal salt of a monocarboxylic acid is used to facilitate the curing of the system.

In the embodiment shown in FIG. 2, the filler or sealant 36 substantially fills the indentation, with the free or outer surface 38 of sealant 36 slightly recessed from major surface 16. In another embodiment, surface 38 of the sealant 36 may be generally level with the major surface 16 of the gasket body 12 and in yet another embodiment, depending on the material used as a filler and the sealing characteristics desired, the outer surface 38 of the sealant 36 may extend beyond the major surface 16 of the gasket body 12. In general, the outer level 38 of filler 36 should not extend past the point where, when the gasket is subjected to compression, the filler will break down, extrude excessively, or otherwise tend to lose its sealing effect.

Figure 3:
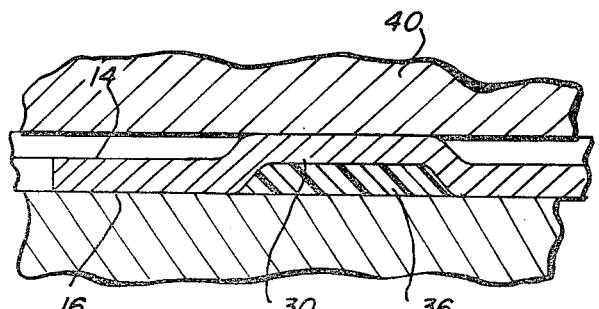
FIG. 3 is a view showing the embossment of FIG. 2 in a compressed state.

FIG. 3 illustrates the gasket of FIG. 1 in sealing engagement between two confronting surfaces 40 and 42. As there seen, the embossment 30 as shown in FIG. 2 has been compressed between surfaces 40 and 42 until the filler 36 bears against the confronting portion of surface 42. The compressive load is then distributed across the entire width of the bead or embossment, but concentrating the sealing effect in the zone of the embossment. Where the filler is a sealant, such as a silicone rubber, it will also tend to flow sufficiently to fill imperfections, such as in the confronting surfaces to be sealed or in the gasket body surface, thereby preventing leakage through such imperfections.

In prior art embossed gaskets, the compressive load tended to be concentrated, as at the points $P_P$ and $P_E$, the upper center of the projection and the points at the edges of the recess at the other side of the gasket, respectively. As the load was applied, the bead or projection tended to flatten out because there was almost point contact at those points. Because of that, in many cases the load, rather than being concentrated at the bead as was intended, was then substantially distributed across the entire surface of the gasket body where the loading and gasket were such that an effective seal was not obtained or maintained. Failure effectively to concentrate loading at the embossment also frequently resulted in leakage due to scratches or other imperfections, as in the embossment or in the mating surfaces. Further, when the embossment effectively crushes, there tends to be essentially no recovery in the sealing zone, and this becomes apparent when embossed gaskets, particularly metal embossed gaskets, are removed from the environment in which they have been used. Lack of recovery evidences lack of resiliency and compliancy, hence, a lack of really effective sealing.

To the contrary, with filled embossments in accordance with this invention, there is substantial and meaningful recovery evidenced upon removal of the gasket from the environment in which they have been used and the embossment remains pronounced rather than being flattened. It is apparent also that the sealing effect of the embossment is across the zone of the projection and that it is effectively concentrated there, rather than being dissipated across the entire gasket body as frequently occurs with prior art embossed gaskets. Further, with fillers, such as elastomers or the like, imperfections in the embossment, surface of the embossment, or surface to be sealed are readily accommodated to, preventing leakage which would otherwise occasionally occur with conventional embossed gaskets.

Figure 2A:
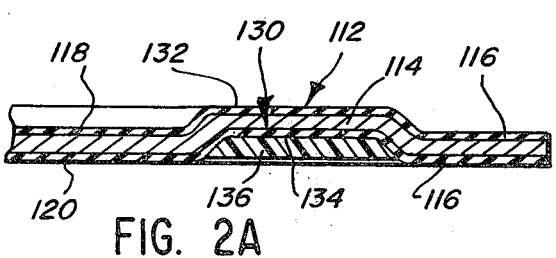
FIG. 2A is a cross-sectional view similar to that of FIG. 2 showing an embossment of another embodiment of the invention.
Figure 3A:
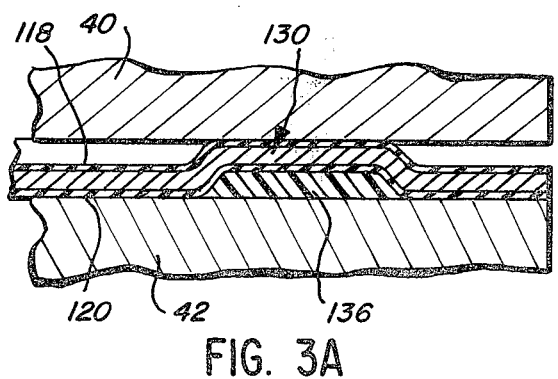
FIG. 3A is a cross-sectional view showing the embossment of FIG. 2A in a compressed state.

As stated, the embossments may suitably be formed by permanently deforming the body of the gasket. In FIGS. 2 and 3, the gasket body is of sheet metal. In the embodiment shown in FIGS. 2A and 3A, the gasket body 112 comprises a thin metallic sheet or core 114 laminated on each side with thin layers 116 of a rubber bonded-asbestos sheet material. Embossment 130 comprises a projecting portion 132 extending upwardly from the first major surface 118 and a corresponding recess 134 which extends inwardly from the other major surface 120. A filler 136, such as a silicone elastomer which substantially fills the recess, is provided. It is slightly recessed below the surface 120. The gasket 112 may be used in the same kind of environment as was gasket 12, with the same kinds of improvements in operating characteristics.

A suitable process for depositing the sealant or filler in the cavities or recesses defined by the embossments is disclosed in U.S. Pat. No. 3,477,867 to Hillier. Generally, the Hillier patent decribes a screen printing process to print a curable liquid sealant material onto a gasket in the area relatively immediately surrounding the edges of an aperture in the gasket. This process may be adapted to use in the present invention by silk screening the sealant directly into the indentations or recesses of the embossments.

As mentioned, the silicone filler may be recessed, may be level with, or may project below the major surface defining the recessed portion of the embossments. Because the gasket of the preferred embodiments is intended for use in an environment having elevated temperatures, it is preferable to use a high temperature resistant silicone elastomer, even though their extrusion resistance is not as great as other materials, such as nitrile epoxies. Since the geometry of the embossment tends to protect the silicone filler against extrusion, it is possible to use the more extrusion-prone silicones at higher temperatures where nitrile-epoxies would otherwise be preferred. However, filler materials other than silicones may be used where temperature considerations are not problems and filler materials other than elastomers may be used depending upon the requirements of particular applications.

It will be apparent from the foregoing that further embodiments of this invention may be made without departing from the spirit and scope of the invention. Accordingly, the scope of the invention is to be considered as being limited only in accordance with the claims.

What is claimed is:

1. An embossed gasket for providing a seal between a pair of confronting surfaces, at least one of which defines an opening, the gasket adapted to be compressed between said pair of confronting surfaces including a body comprising a metallic sheet and having a pair of spaced apart major surfaces defining at least one aperture therethrough adapted to surround said opening, the body having only one elongated embossment surrounding at least a portion of said aperture and spaced away from said aperture for effecting sealing at the zone of the embossment, said embossment comprising a projection extending outwardly from one major surface and a corresponding indentation extending inwardly from the other major surface, and a resilient elastomeric sealant material screen printed and disposed in and partially filling the indentation whereby when the embossment is compressed between the two confronting surfaces, said elastomeric material provides support for said embossment to prevent the embossment from flattening out, thereby to concentrate the sealing effect of the embossment in the zone of the embossment when said gasket is compressed between said pair of surfaces, whereby leakage between said confronting surfaces is prevented and the sealing effect of the gasket is enhanced.

2. The gasket of claim 1 wherein the embossment is continuous and defines a complete annulus completely surrounding at least one aperture.

3. The gasket of claim 1 wherein the body of the gasket generally comprises a metallic sheet having a layer of asbestos-containing material laminated to each side of said metallic sheet.

* * * * *